(No Model.)

A. F. MOLTZEN.
THILL COUPLING.

No. 381,267. Patented Apr. 17, 1888.

Witnesses,
Geo. H. Strong.
J. H. Armes.

Inventor,
A. F. Moltzen.
By Dewey & Co.
Attys

UNITED STATES PATENT OFFICE.

AUGUSTUS F. MOLTZEN, OF OAKLAND, CALIFORNIA.

THILL-COUPLING.

SPECIFICATION forming part of Letters Patent No. 381,267, dated April 17, 1888.

Application filed October 5, 1887. Serial No. 251,556. (No model.)

*To all whom it may concern:*

Be it known that I, AUGUSTUS F. MOLTZEN, of Oakland, Alameda county, State of California, have invented an Improvement in Thill-Couplings; and I hereby declare the following to be a full, clear, and exact description of the same.

My invention relates to the class of thill-couplings; and it consists in the adjustable yoke or bearing-plate to be secured to the axle, the pivoted latch on the shaft-iron for connecting said shaft with the bearing-plate, the spring for holding the latch to its seat and preventing rattling, and the thumb-lever for lifting the latch from its seat in order to release the shaft-iron, all of which I shall hereinafter fully describe.

The object of my invention is to provide a simple and effective thill-coupling, which can be readily manipulated for the purpose of fastening or releasing the shafts.

Figure 1:
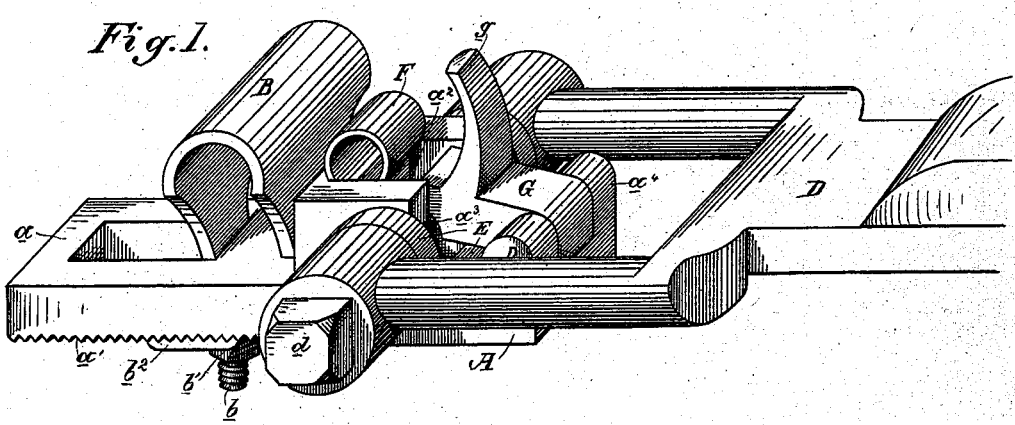
Figure 2:
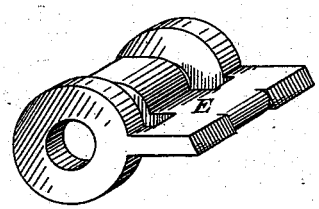
Figure 3:
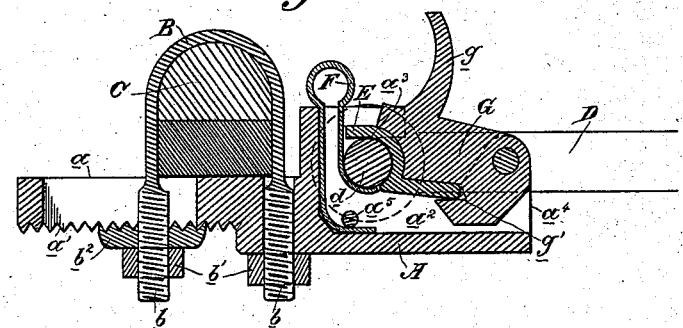
Figure 4:
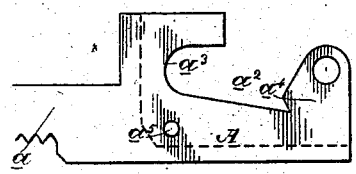

Referring to the accompanying drawings for a more complete explanation of my invention, Figure 1 is a perspective view of my thill-coupling. Fig. 2 is a view of latch-plate E. Fig. 3 is a vertical longitudinal section of the coupling. Fig. 4 is a side elevation of bearing-plate A.

A is the bearing-plate provided with a rearwardly-extending slotted shank, $a$, forming a yoke and having a serrated or toothed under surface, $a'$. The bearing-plate is provided with a socket, $a^2$, terminating at its rear end in recesses $a^3$ and at its forward end in shoulders $a^4$, and a rivet, $a^5$, passes transversely of said piece below the socket.

B is the clip, which passes over the axle C, and has its bolt ends $b$ passing down through the slotted yoke-shank $a$ of the bearing-piece and tightened down by means of nuts $b'$.

Between the nut on the rear bolt end and the serrated under surface of the shank $a$ is a correspondingly serrated or toothed washer, $b^2$, the object of which is to keep that bolt end or leg of the clip in position when said clip is expanded to fit a larger-sized axle. For example, when the clip fits over an axle which is apparently too large for it, the back end or leg of the clip is sprung backwardly, moving in the slot of the yoke shank until the clip comes down to its place on the axle, when by tightening the nut upon the rear bolt end, $b$, the toothed washer $b^2$ is forced to its engagement with the toothed under surface, $a'$, of the yoke-shank $a$, thereby holding the bolt end or leg in the position to which it has been sprung, in order to fit the axle.

D is a shaft-iron, in the forked rear end of which is the cross pin $d$, on which is pivoted the latch-plate E. The shaft-iron passes down on each side of the bearing-plate A, the pivoted latch E entering the socket $a^2$ therein, while the cross-pin $d$ seats itself in the recess $a^3$ at the rear end of the socket, the latch itself being forced forwardly and fitting its forward end or edge into the shoulder $a^4$ at the forward end of the socket. Now in order to keep the latch in this position, so that it cannot rise from any jolting or jarring to which the coupling is subjected, and also to prevent any rattling of the parts, I have the U-spring F, one arm of which passes down and is held under the rivet $a^5$, while the other arm passes down behind the transverse pin $d$ and exerts its power to force the pin forward, thereby holding the forward edge of the latch in the shoulder $a^4$ of the socket $a^2$.

In order to provide for releasing the coupling, I have pivoted in the forward top of the bearing-plate A a lever, G, having on one end a thumb-piece, $g$, and at the other end a shoulder, $g'$, which, when the lever is turned backwardly into place, is in line with the shoulder $a^4$ at the forward end of the bearing-socket. Now, in making the coupling the forward edge of the latch E is first placed in the shoulder $g'$ of the lever G, and is then fitted down in the socket $a^2$ and placed as heretofore described, whereby the lever is drawn down with it until the parts are all seated, the spring F holding them.

To effect the uncoupling, the lever G is thrown backwardly by its thumb-piece, so that its shoulder $g'$, pressing against the forward edge of the latch E, in trying to rise first effects a slight backward movement of the latch against the spring F, sufficient to release its forward edge from the shoulders $a^4$ of the socket, whereupon the latch may be turned up by throwing back the lever, and the shaft-iron may then be removed from the bearing-plate.

Having thus described my invention, what I claim as new, and desire to secure by Letters Patent, is—

1. In a thill-coupling, the combination, with the bearing-plate secured to the axle, having the socket $a^2$, of a shaft-iron having the cross-pin $d$, the latch pivoted thereon within the socketed bearing-plate, and a spring having one arm bearing against the cross-pin and forcing said latch to its seat in the socket, substantially as described.

2. In a thill-coupling, the combination of the bearing-plate secured to the axle and having a socket with recesses at one end and shoulders at the other, a shaft-iron having the cross-pin $d$, a latch within the socketed bearing-plate and pivoted on said pin, a spring bearing against said pin and holding the latch in its seat, and a lever pivoted in the forward end of the bearing-plate and having its lower portion engaging the forward edge of the latch, whereby the latch may be thrown from its engagement with the shoulders of the socket, substantially as described.

3. In a thill-coupling, a bearing-plate secured to the axle, and having a socket with recesses at one end and shoulders at the other, in combination with a shaft-iron having a forked rear end, a transverse pivot-pin between the forks of the shaft-iron for fitting in the recesses of the socketed bearing-piece, and a latch pivoted on the pin for fitting in the socketed bearing-piece and engaging with its forward edge the shoulders of said socket, substantially as herein described.

4. In a thill-coupling, a bearing-plate secured to the axle and having a socket with recesses at one end and shoulders at the other, in combination with a shaft-iron having a pivot-pin in its rear end for fitting the recesses of the socket, a latch-plate pivoted on the pin for fitting in the socket and engaging with its forward edge the shoulders in said socket, and the spring seated in the socketed bearing-plate for holding the latch forward to its engagement, substantially as herein described.

5. In a thill-coupling, a bearing-plate secured to the axle and having a socket with recesses at one end and shoulders at the other, in combination with the shaft-iron having the pivot-pin for fitting the recesses of the socket, a latch pivoted on the pin for fitting the socket and engaging with its forward edge the shoulders therein, a spring seated in the socket for holding the latch to its engagement, and a lever pivoted to the forward end of the bearing-plate and engaging with its lower end the forward edge of the latch, whereby the latch may be thrown from its engagement with the shoulders of the socket, substantially as herein described.

6. In a thill-coupling, the bearing-plate for receiving the shaft connection, and having a rearwardly-extending slotted yoke or shank provided with teeth on its under surface, in combination with a clip fitting over the axle and having its bolt ends passing down through the slots of the yoke or shank, the nut for holding the clip, and a toothed washer held by one of the nuts to the toothed under surface of the yoke or shank, whereby the bolt end of the clip may be adjusted and held to different positions, substantially as herein described.

In witness whereof I have hereunto set my hand.

AUGUSTUS F. MOLTZEN.

Witnesses:
S. H. NOURSE,
H. C. LEE.